(12) United States Patent
Yamasaki (10) Patent No.: US 11,331,898 B2
(45) Date of Patent: May 17, 2022

(54) METHOD OF PEELING PROTECTIVE SHEET FOR PREPREG SHEET AND APPARATUS FOR PEELING PROTECTIVE SHEET FROM PREPREG SHEET

(71) Applicant: MITSUBISHI HEAVY INDUSTRIES, LTD., Tokyo (JP)

(72) Inventor: Yukiharu Yamasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 253 days.

(21) Appl. No.: 16/492,194

(22) PCT Filed: Jan. 18, 2018

(86) PCT No.: PCT/JP2018/001360
§ 371 (c)(1),
(2) Date: Sep. 9, 2019

(87) PCT Pub. No.: WO2018/163608
PCT Pub. Date: Sep. 13, 2018

(65) Prior Publication Data
US 2020/0391497 A1    Dec. 17, 2020

(30) Foreign Application Priority Data
Mar. 10, 2017 (JP) .............................. JP2017-046076

(51) Int. Cl.
*B32B 43/00* (2006.01)
*B29B 13/00* (2006.01)
*B32B 38/10* (2006.01)

(52) U.S. Cl.
CPC ............ *B32B 43/006* (2013.01); *B29B 13/00* (2013.01); *B32B 38/10* (2013.01);
(Continued)

(58) Field of Classification Search
CPC . B32B 38/10; B32B 43/006; Y10T 156/1137; Y10T 156/1168; Y10T 156/1939
See application file for complete search history.

(56) References Cited

U.S. PATENT DOCUMENTS 5,861,077 A     1/1999  Kamijo et al.
2003/0005662 A1  1/2003  Ishii et al.
(Continued)

FOREIGN PATENT DOCUMENTS

GB    2490152 A    10/2012
JP    S63288721 A  11/1988
(Continued)

OTHER PUBLICATIONS

IPRP for PCT/JP2018/001360 dated Sep. 10, 2019, 6pp.
Extended European Search Report for European Application No. 18763459.7 dated Feb. 12, 2020; 7pp.

*Primary Examiner* — Philip C Tucker
*Assistant Examiner* — Nickolas R Harm
(74) *Attorney, Agent, or Firm* — Kanesaka Berner and Partners LLP (57) ABSTRACT

A prepreg sheet attached with a protective sheet is placed on a mounting table to partially overhang. An angle between an edge side direction of an edge section of the mounting table on which overhanging is performed, and a fiber direction of the prepreg sheet, is then set large enough. Overhanging part is physically impacted in a direction to bend fibers of the prepreg sheet to partially peel the protective sheet from the prepreg sheet. A part of the protective sheet peeled from the prepreg sheet is hold and the protective sheet is peeled from an entire surface of the prepreg sheet. A method of peeling a protective sheet from a prepreg sheet more efficiently without damaging the prepreg sheet and an apparatus for peeling to be used therein are provided.

6 Claims, 10 Drawing Sheets

(52) U.S. Cl.
CPC .... *B32B 2305/076* (2013.01); *Y10T 156/1137* (2015.01); *Y10T 156/1168* (2015.01); *Y10T 156/1939* (2015.01)

(56) References Cited

U.S. PATENT DOCUMENTS

| | | |
|---|---|---|
| 2008/0011420 A1 | 1/2008 | Yoshizawa et al. |
| 2012/0227907 A1 | 9/2012 | Arakawa et al. |
| 2015/0314584 A1 | 11/2015 | Dong et al. |

FOREIGN PATENT DOCUMENTS

| | | |
|---|---|---|
| JP | H09151028 A | 6/1997 |
| JP | 2003020135 A | 1/2003 |
| JP | 2004170345 A | 6/2004 |
| JP | 2006130809 A | 5/2006 |
| JP | 2008037574 A | 2/2008 |
| JP | 2011177939 A | 9/2011 |

METHOD OF PEELING PROTECTIVE SHEET FOR PREPREG SHEET AND APPARATUS FOR PEELING PROTECTIVE SHEET FROM PREPREG SHEET

RELATED APPLICATIONS

The present application is a National Phase of International Application Number PCT/JP2018/001360 filed Jan. 18, 2018 and claims priority to Japanese Application Number 2017-046076 filed Mar. 10, 2017.

TECHNICAL FIELD

The present embodiment is concerning a method of peeling protective sheet from prepreg sheet and an apparatus for peeling to be used therein.

BACKGROUND ART

Body, main wings and the like of aircrafts are manufactured by use of prepreg laminate bodies configured by laminating a plurality of prepreg sheets which are punched thin plates of Carbon Fiber Reinforced Plastics (CFRP) or the like. In addition, each prepreg sheet is manufactured by impregnating a fiber sheet, in which a plurality of fibers is arranged in parallel, with a UV curable resin, thermosetting resin or the like in a semi-cured state which are not completely cured and have tackiness. Therefore, one surface or both surfaces of the prepreg sheet is/are attached with a protective sheet, because of the tackiness. Here, fibers which form one prepreg sheet are arranged aligned in a single direction, in a fiber direction in which the fibers extend.

The prepreg laminate body is manufactured by removing the protective sheet from the prepreg sheet, spreading prepreg sheets in a first layer of the prepreg laminate body, then spreading prepreg sheets in a second layer similarly and laminating a plurality of layers of prepreg sheets. Here, it is favorable that fiber directions in two adjacently laminated prepreg sheets cross in a prepreg laminate body that requires a material strength. For example, in a given planar coordinate system, a prepreg sheet with a fiber direction oriented in 0 degree direction is laminated with another prepreg sheet with a fiber direction oriented in 45 degrees or 90 degrees thereon, and a plurality of prepreg sheets are laminated by crossing fiber directions.

Conventionally, those techniques of laminating prepreg sheets required operations by human hands, because delicate skills are required, while recently, market needs increase in productivity improvement and cost reduction, and prepreg sheet laminating apparatuses, which efficiently laminate prepreg sheets, are in practical use.

For example, the prepreg laminating apparatus disclosed in the patent literature 1 is provided with a first roller, a second roller and a means for peeling release paper in advance and is used to laminate a plurality of prepreg sheets, in which fiber sheets are impregnated with a resin, to form a prepreg laminate body. A protective sheet is attached on one surface of the prepreg sheet and the prepreg laminating apparatus has a function of peeling the protective sheet. The first roller is arranged in a front-rear direction of a body to be laminated and guides the prepreg sheet in a single direction. In addition, the second roller presses the prepreg sheet having passed the first roller from one surface thereof and guides the protective sheet in order to peel from the one surface of the prepreg sheet, so that the protective sheet is peeled.

CITATION LIST

Patent Literature

[Patent Literature 1] JP 2011-177939A
[Patent Literature 2] JP S63-288721A

SUMMARY OF THE INVENTION

However, the prepreg laminating apparatus disclosed in the patent literature 1 has a process of sandwiching the prepreg sheet attached with the protective sheet and tear the protective sheet off while pressing, in order to peel the protective sheet from the prepreg sheet. The prepreg sheet is vulnerable to excessive pressure because formed by impregnating with a resin in semi-cured state, and therefore the prepreg sheet may be damaged while tearing-off process. In addition, peeling effect is weak and limited in peeling technology using rollers and effective peeling technologies are required.

By the above, the present invention aims to provide a method of peeling a protective sheet from a prepreg sheet more efficiently without damaging the prepreg sheet, and an apparatus for peeling to be used therein.

According to a first aspect of the present invention, an apparatus for peeling a protective sheet from a prepreg sheet is provided with a mounting table, a movable arm, a peeling trigger section and a peeling section. Here, the movable arm holds a prepreg sheet attached with the protective sheet to move the prepreg sheet on the mounting table and arranges the prepreg sheet so that an edge section of both the prepreg sheet and the protective sheet overhangs the mounting table. The peeling trigger section impacts a part of the prepreg sheet and the protective sheet which overhangs the mounting table so that at least a part of the protective sheet is peeled from the prepreg sheet. The peeling section holds by suction the protective sheet and completely peels the protective sheet from the prepreg sheet.

According to a second aspect of the present invention, a method of peeling a protective sheet from a prepreg sheet includes a step of determining a fiber direction of a prepreg sheet, a step of physically impacting a protective sheet attached to the prepreg sheet from a direction to bend fibers of the prepreg sheet, to partially peel the protective sheet from the prepreg sheet and a step of holding and moving the partially peeled protective sheet to peel the protective sheet from the entire surface of the prepreg sheet.

According to the method of peeling a protective sheet from a prepreg sheet and the apparatus for peeling a protective sheet from a prepreg sheet in the present invention, a protective sheet can be peeled effectively, without damaging a prepreg sheet attached with the protective sheet.

DESCRIPTION OF THE EMBODIMENTS (Embodiment)

An apparatus for peeling a protective sheet from a prepreg sheet according to an embodiment of the present invention will be described below, by use of drawings.

A prepreg sheet to be processed by the apparatus for peeling protective sheet from prepreg sheet according to an embodiment of the present invention is formed by impregnating a fiber sheet, in which a plurality of fibers are arranged by aligning a fiber direction, with a Ultra Violet (UV) curable resin, a thermosetting resin or the like in a semi-cured state. Here, at least one of surfaces of the prepreg sheet has tackiness and therefore is attached with a protective sheet consisting of Polyethylene Terephthalate (PET), Polyester (PEs) or the like. In addition, a prepreg laminate body, which is a material for composite material, is formed by laminating a plurality of prepreg sheet layers. A first prepreg sheet layer is formed by removing protective sheet from each prepreg sheet and by arranging a plurality of prepreg sheets in parallel to spread on a flat surface.

Figure 1A:
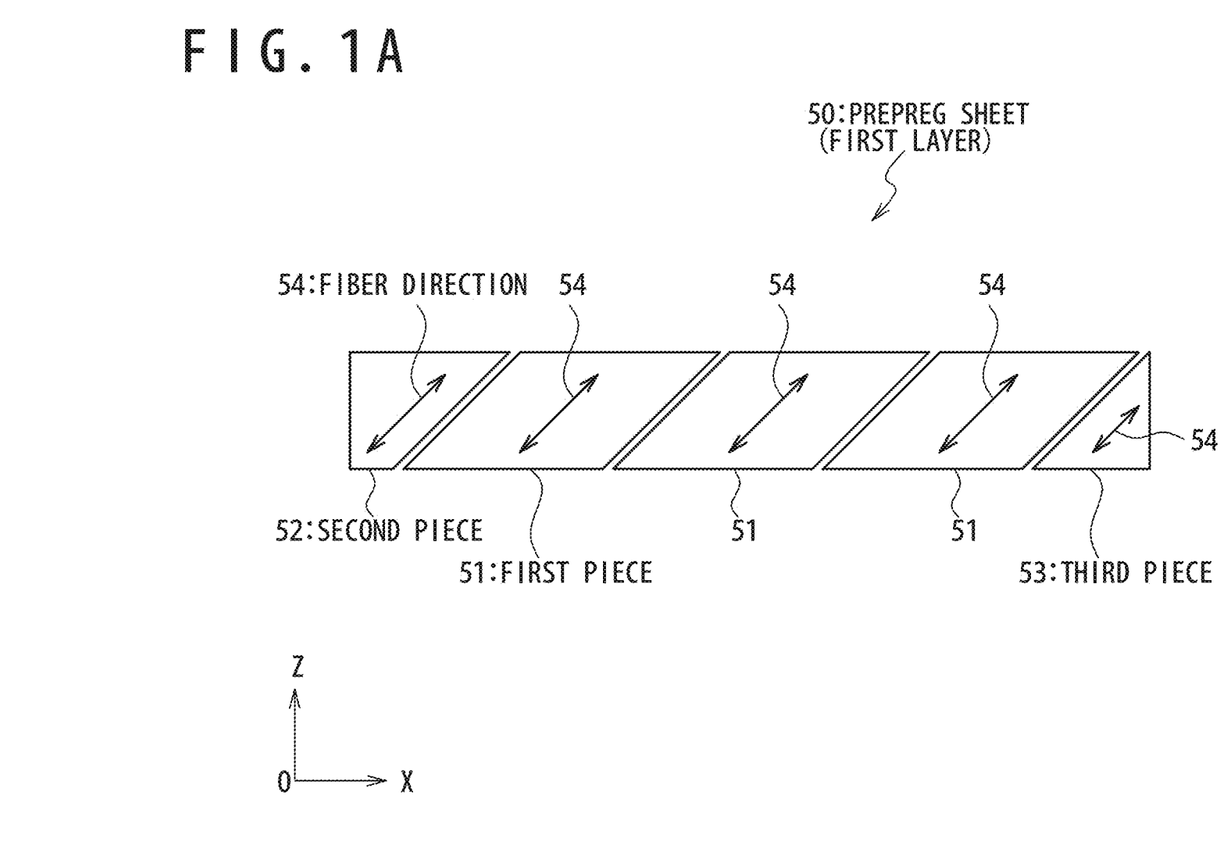
FIG. 1A is a top view schematically showing an example of a shape of a prepreg sheet used in the present invention.

FIG. 1A is a top view schematically showing an example of a shape of a prepreg sheet 50 used in the present invention. In the example of FIG. 1A, the first layer of the prepreg laminate body, in which a fiber direction 54 of the prepreg sheet 50 is arranged in 45 degrees with respect to a given planar coordinate system, is formed by spreading prepreg sheets with a parallelogram shape (first pieces 51), a prepreg sheet of trapezoid shape (second piece 52) and a prepreg sheet of triangle shape (third piece 53).

Figure 1B:
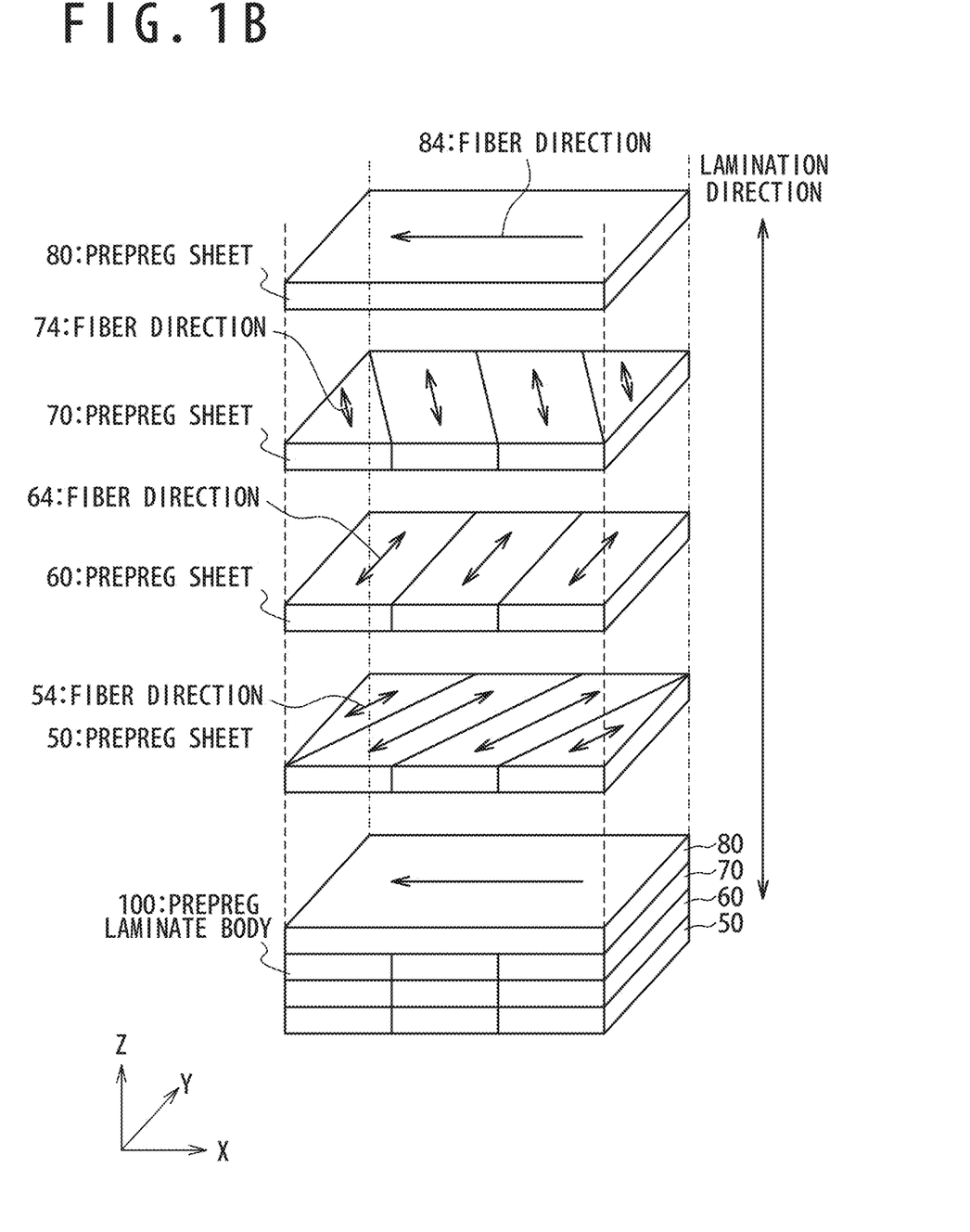
FIG. 1B is a diagram showing a configuration example of a prepreg laminate body.

FIG. 1B is a diagram showing a configuration example of a prepreg laminate body 100. The prepreg laminate body 100 is manufactured by forming a prepreg sheet 60 as a second layer of the prepreg laminate body 100, a prepreg sheet 70 as a third layer of the same and a prepreg sheet 80 as a fourth layer, similarly to the prepreg sheet 50 as a first layer of the prepreg laminate body 100, and by sequentially laminating those prepreg sheets 50, 60, 70 and 80.

Figure 1C:
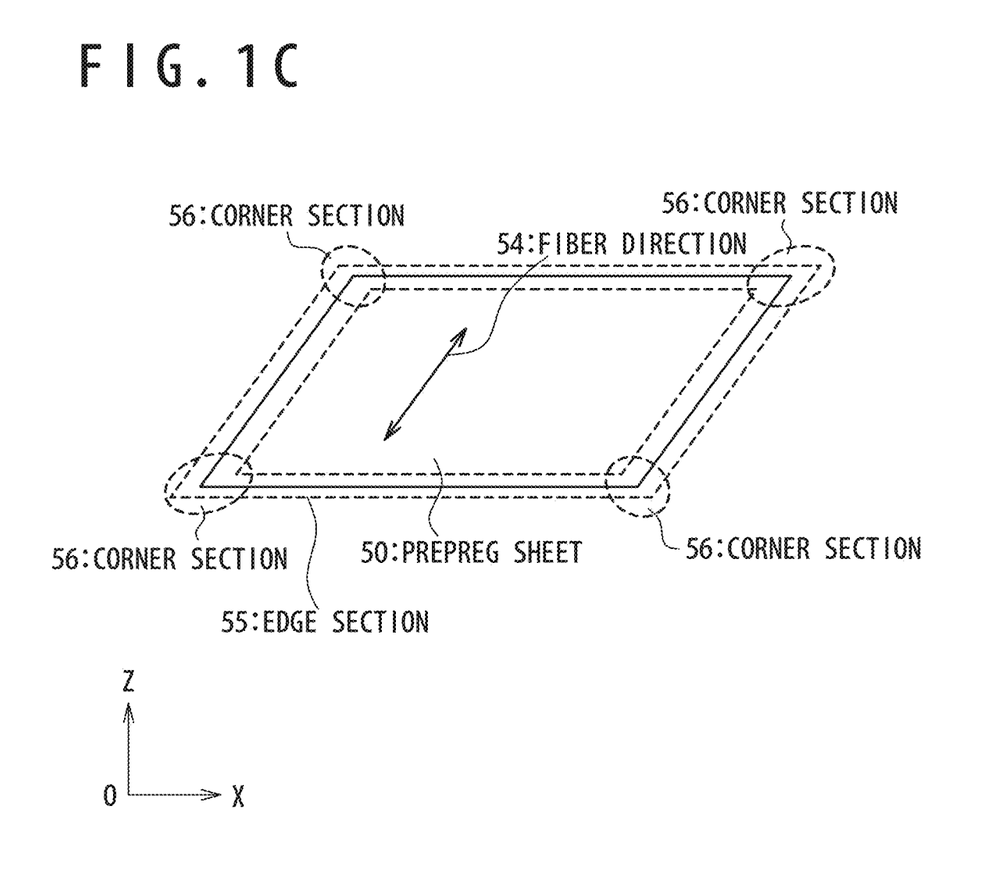
FIG. 1C is a top view showing an example of positional relationship of a prepreg sheet, edge sections and corner sections.

Here, in order to improve strength of the prepreg laminate body 100, it is favorable that the fiber direction 54 of the prepreg sheet 50 of the first layer and a fiber direction 64 of the prepreg sheet 60 of the second layer are different. For example, on a prepreg sheet with a fiber direction of 0 degree, another prepreg sheet with a fiber direction of 45 degrees or 90 degrees is laminated, and so on, a plurality of prepreg sheets are laminated so that respective fiber direction cross. Here, an outer peripheral part of the prepreg sheet 50 will be called edge section 55, and vertex part of the edge section 55 in particular will be called corner section 56. FIG. 1C is a top view showing an example of positional relationship of a prepreg sheet 50, edge sections 55 and corner sections 56.

Figure 2:
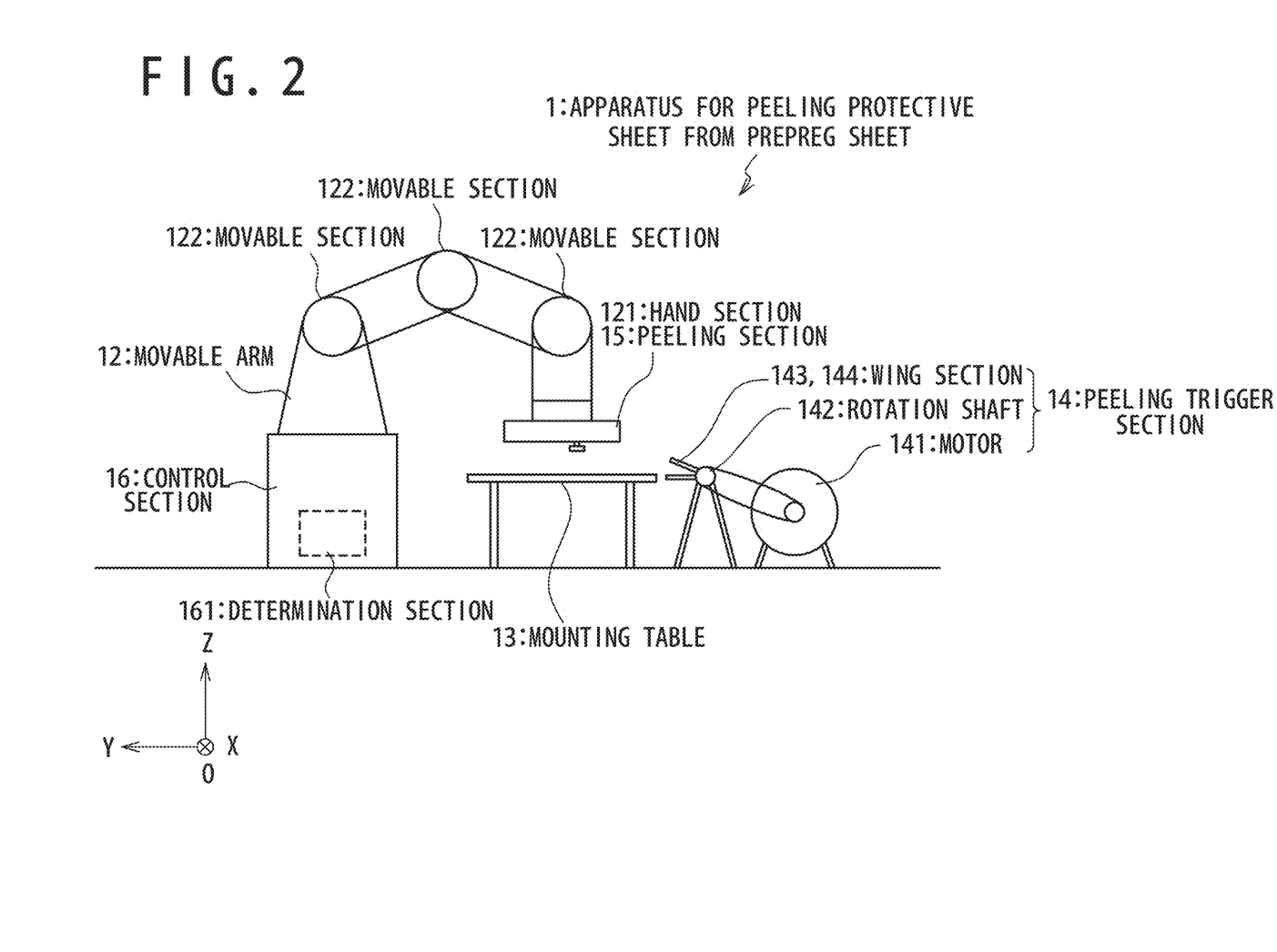
FIG. 2 is a diagram showing an example of an overall configuration of an apparatus for peeling protective sheet from prepreg sheet according to an embodiment of the present invention.

FIG. 2 is a diagram showing an example of an overall configuration of an apparatus 1 for peeling protective sheet from prepreg sheet according to an embodiment of the present invention. As shown in FIG. 2, the apparatus 1 for peeling protective sheet from prepreg sheet is provided with a movable arm 12, which holds and moves a prepreg sheet attached with a protective sheet, a mounting table 13, on which the prepreg sheet attached with the protective sheet is placed, a peeling trigger section 14, which physically impacts the prepreg sheet attached with the protective sheet and partially peels the protective sheet from the prepreg sheet to trigger peeling of the protective sheet, and a peeling section 15, which holds and moves the protective sheet partially peeled from the prepreg sheet to peel the protective sheet from the entire surface of the prepreg sheet.

The movable arm 12 is provided with a hand section 121, which hold the prepreg sheet, a movable section 122, which moves the prepreg sheet held by the hand section 121 to the mounting table 13, and a control section 16. In the configuration example in FIG. 2, a same configuration is used as the hand section 121 and as the peeling section 15.

The peeling trigger section 14 is provided with a motor 141, a rotation shaft 142 and wing section 143, 144. The control section 16 is provided with a determination section 161.

Figure 3:
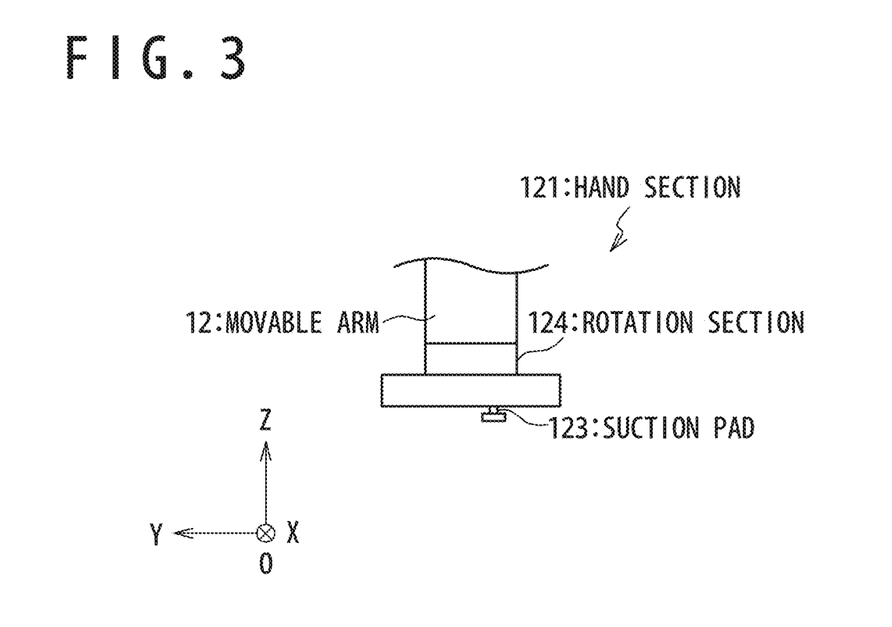
FIG. 3 is a diagram showing an essential part of a movable arm according to an embodiment of the present invention.

FIG. 3 is a diagram showing an essential part of a hand section 121 of a movable arm 12 according to an embodiment of the present invention. For example, the hand section 121 is provided with a suction pad 123 and a rotation section 124. The suction pad 123 makes a surface of the suction pad 123 in a vacuum state, by use of a non-illustrated vacuum ejector, to enable a sheet-shaped target object in contact with the suction pad 123 to be held by suction thereon. The movable sections 122 in FIG. 2 are connected to the hand section 121 to support the hand sections 121 and are able to freely move the hand section 121 in a vertical direction and in a horizontal direction. The rotation section 124 is able to rotate the held prepreg sheet 50 in 360 degrees in horizontal plane, by rotating the suction pad 123.

Here, moves of the movable arm 12 in horizontal direction, vertical direction and rotation direction are able to drive the movable sections 122 in accordance with the control section 16 provided in the movable arm 12, and arrange the prepreg sheet 50 held by the hand section 121, by freely controlling a position and an angle with respect to the mounting table 13. In addition, the control section 16 is further provided with a determination section 161, which determines a fiber direction 54 of fibers that the prepreg sheet 50 contains, and is able to freely control the position and the angle of the prepreg sheet 50 with respect to the mounting table 13, in accordance with the determination result of the fiber direction 54.

Here, the determination of the fiber direction 54 may be performed, for example, by use of a Charge Coupled Device (CCD) camera and an image recognition processing device which are not illustrated. Here, the image recognition processing device may be a computer which is provided with a processing device, a memory device and various interfaces and executes given programs.

Firstly, various prepreg sheets are formed in different shapes respectively to fiber directions thereof. Data showing relationship between shapes and fiber directions of the prepreg sheets may be stored in the memory device of the image recognition processing device. In the example of FIG.

1B, the prepreg sheet 50, of which the fiber direction 54 is in 45 degrees with respect to the planar coordinate system OXY, and the prepreg sheet 70, of which the fiber direction 74 is in −45 degrees with respect to the same coordinate system, both have a parallelogram shape. However, two prepreg sheets 50 and 70, of which the fiber directions are different, cannot be overlapped to each other unless any one is turned over. Similarly, each part of the prepreg sheet 80, of which the fiber direction 84 is 0 degree with respect to the planar coordinate system OXY, and each part of the prepreg sheet 60, of which the fiber direction 64 is 90 degrees with respect to the same coordinate system, both have a rectangular shape and share a feature in which the longitudinal direction thereof is identical to the fiber direction thereof, while can be distinguished by sizes and aspect ratios thereof. As described above, it is favorable that the relationship between shapes of the prepreg sheets 50, 60, 70, 80 and the fiber directions 54, 64, 74, 84 is so that the latter ones can be determined by distinguishing the former ones. Next, the CCD camera takes images of prepreg sheet shapes to generate image data. The image recognition processing device executes an image recognition processing software and processes image data to determine which among the above four kinds the shape of the imaged prepreg sheet is. The image recognition processing device is able to determine the fiber direction of the prepreg sheet by referring data showing relationship between the determined shape and fiber direction of the prepreg sheet.

It should be noted that the hand section 121 may be provided with a configuration, other than a suction member, to hold the prepreg sheet 50 by sandwiching for example, and in addition, may use further other member as long as such configuration can grip the sheet. In addition, the control section 16 and the determination section 161 do not need to be provided integrated to the movable arm 12, and may be provided as a new mechanism having the control section 16 and the determination section 161 separately.

The mounting table 13 has a flat plate shape able to horizontally support the prepreg sheet 50 at any position, and a prepreg sheet 50, which is held and moved by the movable arm 12 and to which the protective sheet 40 is attached with, is placed thereon.

Here, the prepreg sheet 50 is placed on the mounting table 13 with the protective sheet 40 to be peeled as the top surface. In other words, by placing the prepreg sheet 50 with its surface to which the protective sheet is not attached with as the bottom surface, the position of the prepreg sheet 50 with respect to the mounting table 13 may be easily fixed, by the tackiness of the bottom surface of the prepreg sheet 50. In addition, the prepreg sheet 50 is arranged so that a part of the edge section 55 or the corner section 56 of the prepreg sheet 50 overhangs the edge section 131 of the mounting table 13. Here, the part of the prepreg sheet 50 overhanging the edge section 131 of the mounting table 13 is used as an impact tip 57 for the peeling trigger section 14 to physically impact the prepreg sheet 50. In addition, the mounting table 13 may be provided with a holding device to hold the prepreg sheet 50, a mechanism to hold the prepreg sheet 50 by a vacuum suction or static electricity, or the like.

The peeling trigger section 14 directly and physically impacts the protective sheet 40 in the part of impact tip 57, of the prepreg sheet 50 placed on the mounting table 13 in a state in which the protective sheet 40 is attached with on the top surface thereof, to cause a partial peeling between the protective sheet 40 and the prepreg sheet 50.

Figure 4A:
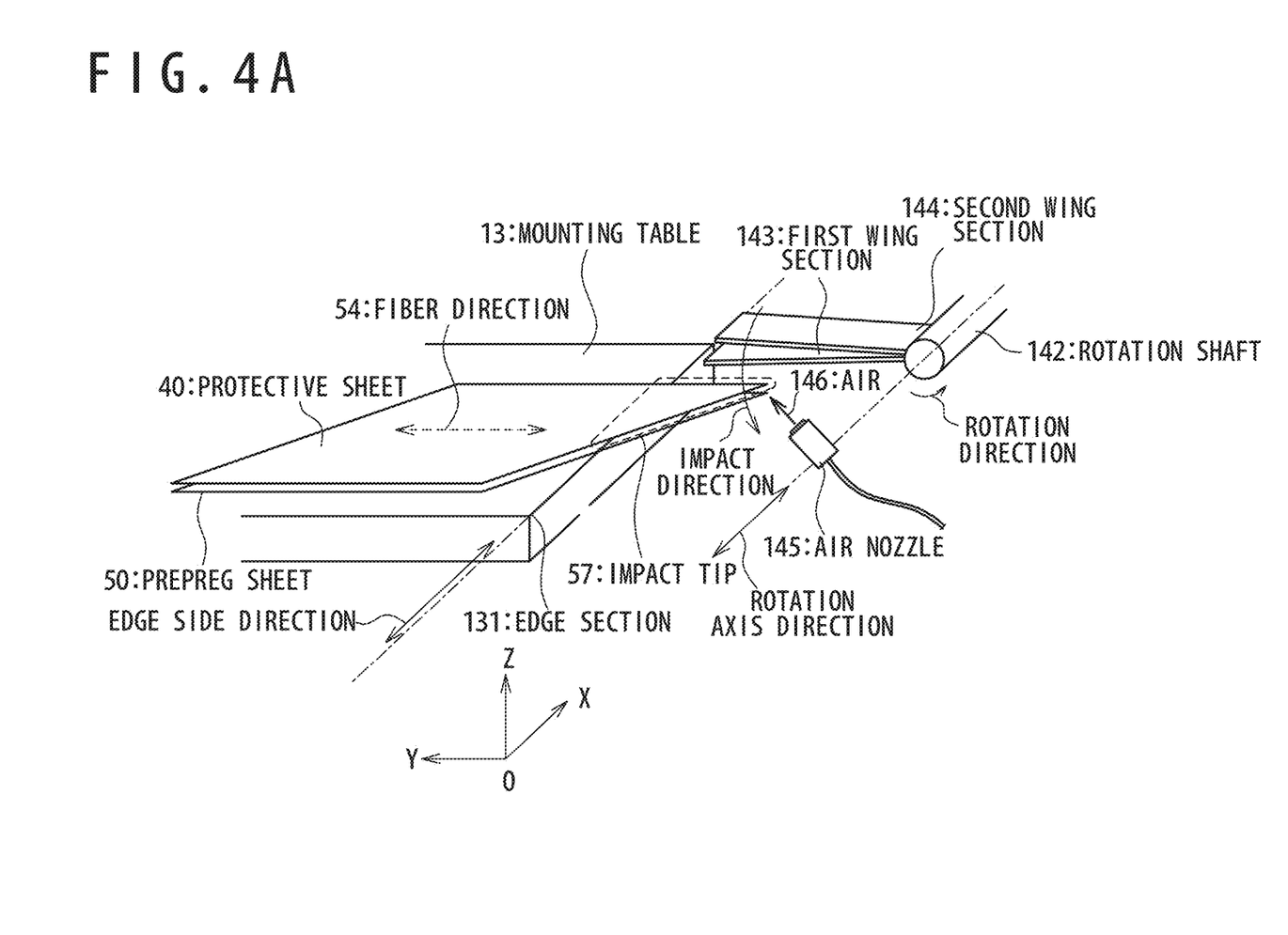
FIG. 4A is a perspective view showing an essential part of a peeling trigger section according to an embodiment of the present invention.

FIG. 4A is a diagram showing an essential part of a peeling trigger section 14 according to an embodiment of the present invention. The peeling trigger section 14 in FIG. 4A is provided with the motor 141 in FIG. 2, a rotation shaft 142 which rotates by a power of the motor 141 and the first wing section 143 and the second wing section 144 provided to the rotation shaft 142. The rotation shaft 142, to which a power of the motor 141 is transmitted, is arranged at a position in which the wing sections 143 and 144, which rotate together with the rotation shaft 142, can physically impact a part of the impact tip 57 of the prepreg sheet 50 and the protective sheet 40, directly. The rotation shaft 142 may be integrated to a rotation shaft of the motor 141, or may be a rotation shaft 142 which is transmitted with a power from the rotation shaft of the motor 141 to separately rotate.

Here, the inventors of the present invention have found out that, when partially peeling the protective sheet 40 from the prepreg sheet 50, an effect of partially peeling the protective sheet 40 is enhanced by arranging the edge section 55 or the corner section 56 of the prepreg sheet 50 and the protective sheet 40, with an overhanging from the edge section 131 of the mounting table 13 by a given length, as the impact tip 57. In addition, it is favorable that the length of the impact tip 57 is set between 20 mm and 30 mm to effectively peel the protective sheet 40.

In addition, as described above, fibers in one prepreg sheet 50 is arranged in one substantially same direction; however, the inventors of the present invention have found out that, when performing the peeling of the protective sheet 40 from the prepreg sheet 50, the effect of peeling the protective sheet is enhanced by satisfying following three conditions.

That is, as a first condition, each of the edge section 131 of the mounting table 13, which the impact tip 57 overhangs, and edge sections of the wing section 143, 144, has a substantially linear shape, and, the edge sections of the wing sections 143, 144 and the edge section 131 of the mounting table 13 are in parallel at the moment the wing sections 143, 144 impact the impact tip 57.

Figure 4B:
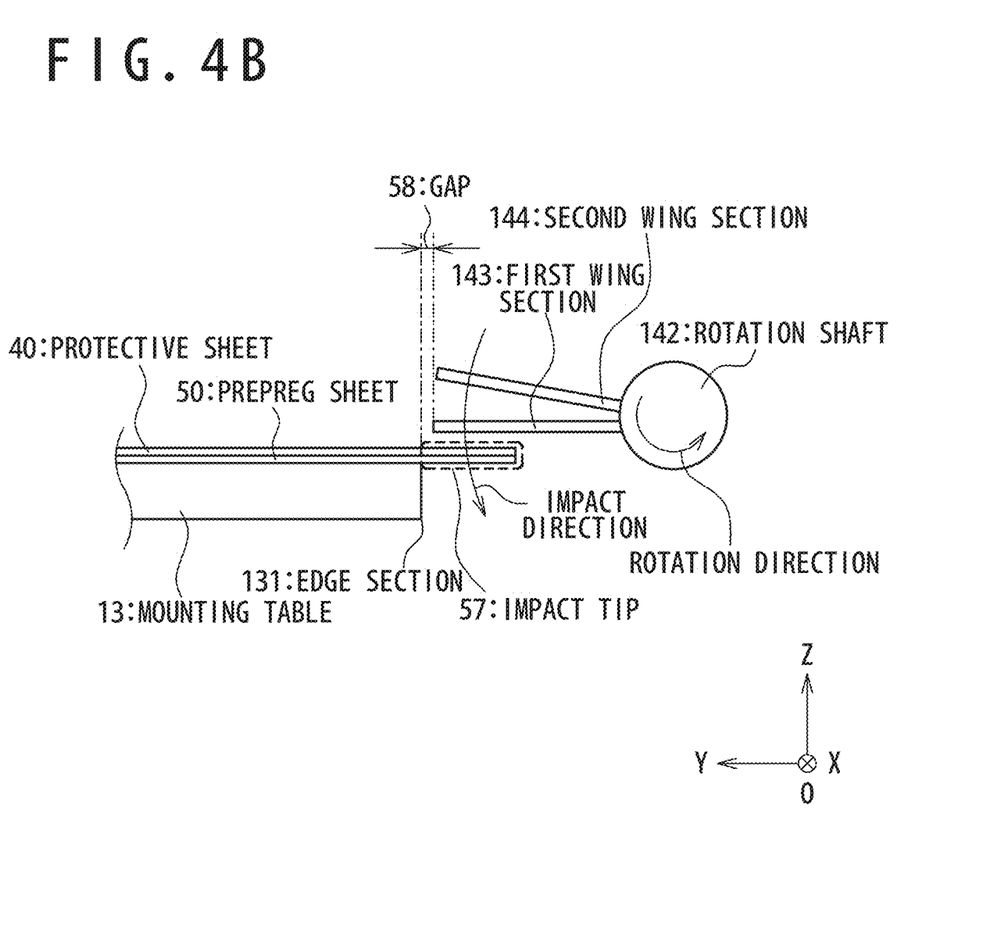
FIG. 4B is a diagram showing an example of a gap according to the present embodiment.
Figure 4C:
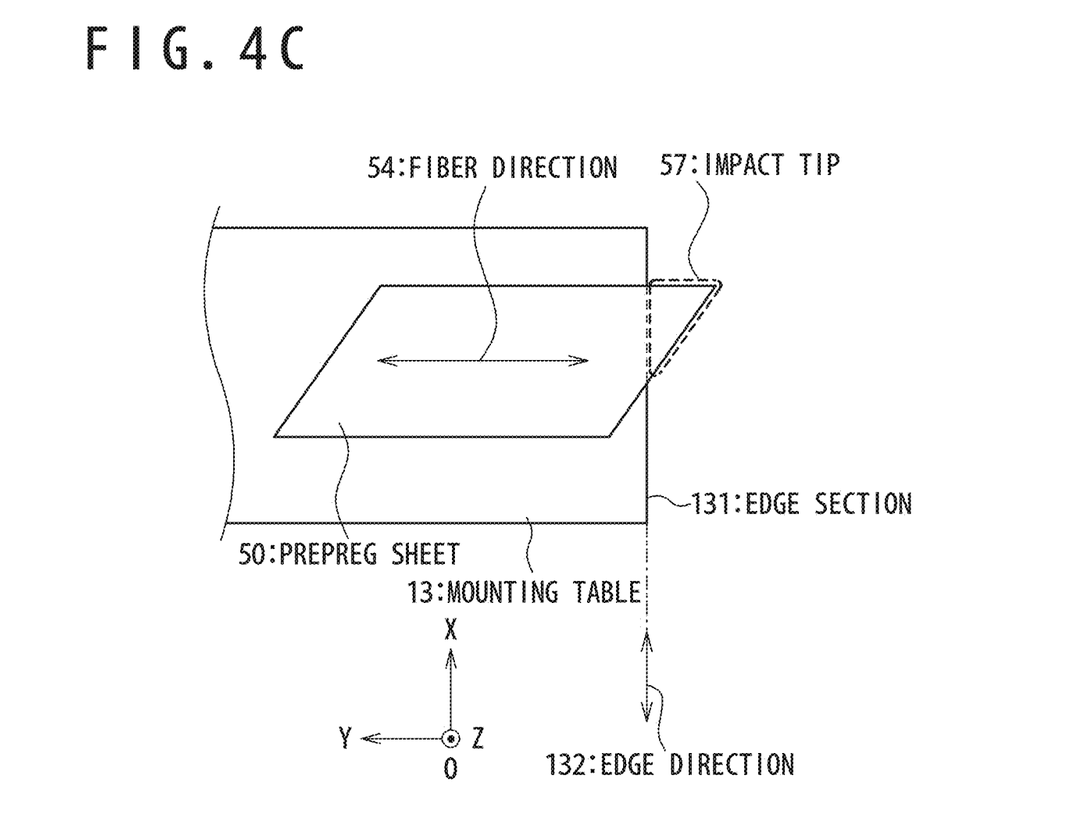
FIG. 4C is a diagram showing an example of an edge side direction according to the present embodiment.
Figure 4D:
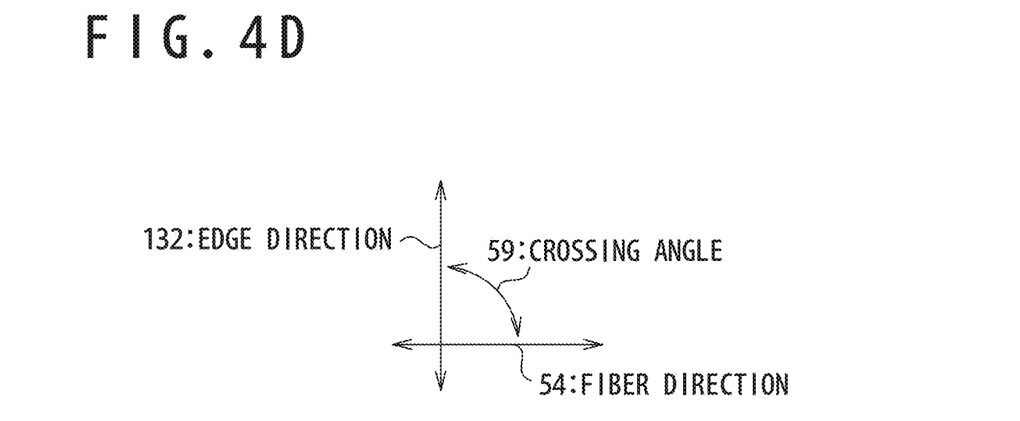
FIG. 4D is a diagram showing an example of a crossing angle according to the present embodiment.

As a second condition, a gap 58 from the edge sections of the wing sections 143, 144 to the edge section 131 of the mounting table 13 is short enough at the moment the wing sections 143, 144 impact the impact tip 57. FIG. 4B is a diagram showing an example of a gap 58 according to the present embodiment. Concerning the second condition, the length of the gap 58 is favorably longer than 1 mm and shorter than 2.5 mm. However, it is favorable that the favorable range of the length of the gap 58 is appropriately adjustable in accordance with a sum of thickness of each of the prepreg sheet 50 and the protective sheet 40, a crossing angle 59 between the fiber direction 54 of the prepreg sheet 50 and the edge side direction 132 of the edge section 131 of the mounting table 13, a number and materials of the wing sections 143, 144, and the like. FIG. 4C is a diagram showing an example of an edge side direction 132 according to the present embodiment. FIG. 4D is a diagram showing an example of a crossing angle 59 according to the present embodiment.

As a third condition, the crossing angle 59 between the edge side direction 132 of the edge section 131 of the mounting table 13 and the fiber direction 54 of the prepreg sheet 50 is large enough. This third condition means in other words that the prepreg sheet 50 is arranged with respect to the mounting table 13 so that the physical impact from the wing sections 143, 144 of the peeling trigger section 14 is added in a direction to bend fibers of the prepreg sheet 50. Concerning this third condition, the apparatus 1 for peeling a protective sheet 40 from a prepreg sheet 50 according to an embodiment of the present invention firstly determines the fiber direction 54 of the prepreg sheet 50 by the determination section 161. Next, the control section 16 controls the direction of the hand section 121 of the movable arm 12 by appropriately rotating the movable sections 122 and the rotation section 124, so that the crossing angle 59 between the fiber direction 54 of the prepreg sheet 50 and the edge side direction 132 of the edge section 131 of the mounting table 13 is included in a favorable range. In this way, the apparatus 1 for peeling the protective sheet 40 from the prepreg sheet 50 according to the present embodiment can place the prepreg sheet 50 attached with the protective sheet 40 on the mounting table 13 with a favorable position and a favorable angle both relative to the edge section 131.

Here, it is favorable to place the prepreg sheet 50 on the mounting table 13 so that the crossing angle 59 between the fiber direction 54 of the prepreg sheet 50 and the edge side direction 132 is included in a range between 10 degrees and 170 degrees. This crossing angle 59 is preferably included in a range between 30 degrees and 150 degrees, is further preferably included in a range between 60 degrees and 120 degrees, and ideally equals to 90 degrees.

In addition, each of the wing sections 143, 144 is a thin plate in a shape of a rectangle consisting of an elastic body such as a rubber, for example, and is arranged so that a short side of the rectangle is along the rotation shaft 142. In addition, the wing sections 143, 144 provided on the rotation shaft 142 may be single or plural. For example, the shape of each of the wing sections 143, 144 is favorably a shape of a rectangle with a long side of 60 mm and a thickness of 2 mm. It should be noted that the wing sections 143, 144 in the present invention is not limited to have a thin plate of a rectangular shape and may have any shape as long as it can physically impact the impact tip 57 of the prepreg sheet 50 and the protective sheet 40 overhanging the mounting table.

The peeling section 15 completely peels the protective sheet 40 from an entire surface of the prepreg sheet 50 by holding and moving a part of the protective sheet 40 partially peeled from the prepreg sheet 50. Here, as shown in FIG. 2, the apparatus 1 for peeling the protective sheet 40 from the prepreg sheet 50 according to an embodiment of the present invention may provide the hand section 121 of the movable arm 12 with a function similar to the one of the peeling section 15, that is, the peeling section may be integrated to the movable arm 12.

Figure 4E:
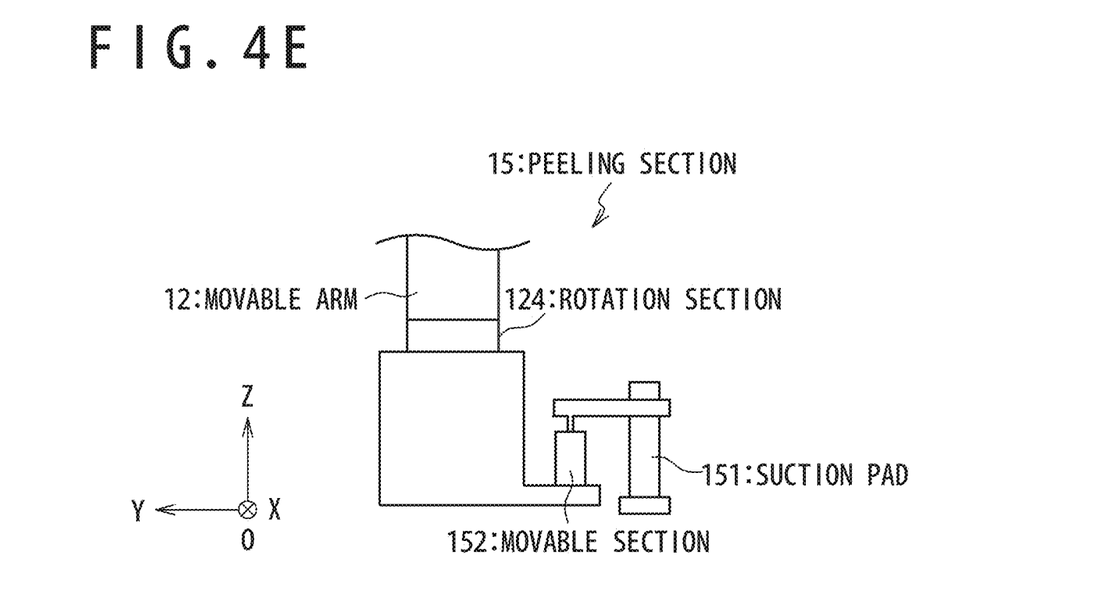
FIG. 4E is a diagram showing an essential part of a peeling section according to the present embodiment.

FIG. 4E is a diagram showing an essential part of a peeling section 15 according to an embodiment of the present invention. The peeling section 15 in FIG. 4E is provided with a suction pad 151, which holds the protective sheet 40 by vacuum suction, and a movable section 152 including an air cylinder which supports the suction pad 151 with a vertical movability in up and down directions. The suction pad 151 holds by suction the part of the impact tip 57, which overhangs the mounting table 13, of the protective sheet 40, and which is peeled from the prepreg sheet 50 by the peeling trigger section 14, and then remain in this state and rises by movement of the movable section 152 to peel the protective sheet 40 from the entire surface of the prepreg sheet 50.

The peeling section 15 may be provided to the movable arm 12 via the rotation section 124, or, another movable arm with the suction pad 151 may be provided to be used as the peeling section 15. Here, the peeling section 15 is not limited to a peeling method by use of a suction member. The peeling section 15 may be a configuration able to hold the protective sheet 40 by sandwiching, for example, and any other member may be used as the peeling section 15 as long as it can hold the protective sheet 40.

In addition, the apparatus 1 for peeling the protective sheet 40 from the prepreg sheet 50 may be provided with an air nozzle 145 which injects air 146 to the prepreg sheet 50 attached with the protective sheet 40. In a step of operating the peeling trigger section 14, by injecting air 146 to the edge section of the impact tip 57 overhanging the mounting table 13, a peeling efficiency of the peeling trigger section 14 can be improved. In addition, to effectively peel the protective sheet 40, it is favorable to arrange an air nozzle 145 in a position from below of which the air 146 can be injected to the edge section of the impact tip 57 overhanging the mounting table 13.

Figure 5:
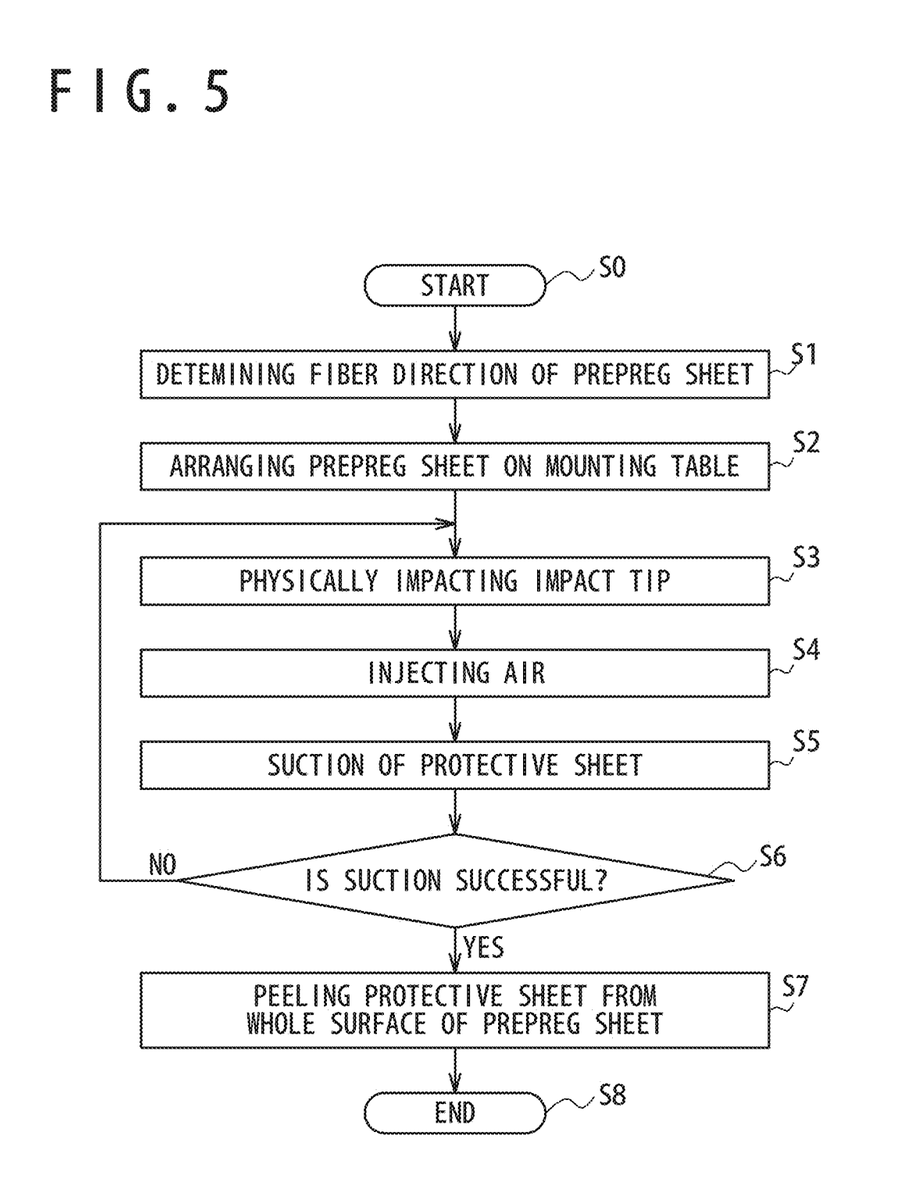
FIG. 5 is a flowchart showing an example of each step of a method of peeling protective sheet from prepreg sheet according to an embodiment of the present invention.

Next, an operation of the apparatus 1 for peeling the protective sheet 40 from the prepreg sheet 50 according to the present embodiment, that is, a method of peeling the protective sheet 40 from the prepreg sheet 50 according to the present embodiment, will be described. FIG. 5 is a flowchart showing an example of each step of a method of peeling protective sheet from prepreg sheet according to an embodiment of the present invention. Firstly, the movable arm 12 holds and moves the prepreg sheet 50 attached with the protective sheet 40 and places them on the mounting table 13 so that the edge section 55 or the corner section 56 of the prepreg sheet 50 and the protective sheet 40 overhangs from the edge section 131 of the mounting table 13 by a given length, as the impact tip 57 to be impacted by the peeling trigger section 14 (step S2).

Here, the movable arm 12 determines in advance, by the determination section 161, the fiber direction 54 of the prepreg sheet 50 (step S1), and arrange the prepreg sheet 50 by controlling the crossing angle 59 between the fiber direction 54 of the prepreg sheet 50 and the edge side direction 132 of the edge section 131 of the mounting table 13 to be included in a favorable range.

Next, in the peeling trigger section 14, the rotations shaft 142 rotates by a movement of the motor 141, the wing sections 143, 144 provided to the rotation shaft 142 directly contact with and physically impact the protective sheet 40 to partially peel the protective sheet 40 from the prepreg sheets 50 and then a state in which the protective sheet 40 is turned up can be obtained (step S3). Here, the air nozzle 145 provided to the apparatus 1 for peeling the protective sheet 40 from the prepreg sheet 50 may efficiently induce the partial peeling of the protective sheet 40 from the prepreg sheet 50 by injecting the air 146 to the protective sheet 40 (step S4).

Next, after a given time has passed, the movable section 152 of the peeling section 15 is driven, the suction pad 151 is lowered by use of an air cylinder or the like and a suction of the protective sheet 40 in a partially peeled state is tried (step S5).

Next, after a given time has passed, the movable section 152 of the peeling section 15 is again driven and the suction pad 151 is raised. Here, in a case in which the peeling section 15 is holding the protective sheet 40 by suction ("YES" in step S6), the movable arm 12 drives and moves the protective sheet 40 so that the protective sheet 40 can be peeled from the entire surface of the prepreg sheet 50 (step S7).

On the other hand, in a case in which the peeling section 15 is not holding the protective sheet 40 by suction or the holding by suction is not enough ("NO" in step S6), the peeling trigger section 14 is driven again during a given time and the movable section 152 of the peeling section 15 is driven again (step S3). After that, the step of driving the peeling trigger section 14 and the step of driving the peeling section 15 will be repeated until the protective sheet 40 is peeled from the entire surface of the prepreg sheet 50.

Embodiments of the present invention have been described above in detail by use of drawings while each configuration, combinations thereof and the like in each embodiment are examples and are not intended to limit the scope of the invention, unless sizes, materials, shapes, relative arrangements thereof and the like of component parts shown in the embodiments are especially and specifically described. In addition, additions, omissions, substitutions and other modifications of configuration can be performed without departing from the spirit of the present invention.

The present application is based on the Japanese Patent Application (JP 2017-046076) filed on Mar. 10, 2017, and claims priority thereof. All the disclosure of this application is incorporated by reference in the present application.

The invention claimed is:

1. An apparatus for peeling a protective sheet from a prepreg sheet, comprising:
   a mounting table;
   a movable arm configured to hold the prepreg sheet attached with the protective sheet to move the prepreg sheet on the mounting table and arrange the prepreg sheet so that an edge section of both the prepreg sheet and the protective sheet overhangs the mounting table as an impact tip;
   a peeling trigger section configured to rotate a wing section that impacts a part of the impact tip of the prepreg sheet and the protective sheet which overhangs the mounting table so that at least a part of the protective sheet is peeled from the prepreg sheet;
   a peeling section configured to
      hold by suction the protective sheet by use of a suction pad supported by a movable section with a vertical mobility, and
      completely peel the protective sheet from the prepreg sheet;
   a determination section configured to determine a fiber direction of the prepreg sheet by use of a Charge Coupled Device camera and an image recognition processing device; and
   a control section configured to control an angle between a first direction, which is the fiber direction of the prepreg sheet, and a second direction, which is a direction of an edge section of the mounting table that the prepreg sheet and the protective sheet overhang, wherein the angle is greater than 30 degrees and smaller than 150 degrees.

2. The apparatus for peeling the protective sheet from the prepreg sheet according to claim 1,
   wherein the angle is in a range between 60 degrees and 120 degrees.

3. The apparatus for peeling the protective sheet from the prepreg sheet according to claim 2, wherein
   the peeling trigger section comprises:
      a motor;
      a rotation shaft configured to rotate by a power of the motor; and
      the wing section provided along the rotation shaft.

4. The apparatus for peeling the protective sheet from the prepreg sheet according to claim 3, further comprising:
   an air nozzle configured to inject air to the protective sheet which is partially peeled to induce a further peeling of the protective sheet.

5. A method of peeling a protective sheet from a prepreg sheet, comprising:
   determining a fiber direction of the prepreg sheet;
   moving the prepreg sheet attached with the protective sheet on a mounting table and arranging the prepreg sheet so that only one corner section of both the prepreg sheet and the protective sheet overhangs an edge section of the mounting table by a given length as an impact tip, wherein an angle between a first direction, which is the fiber direction of the prepreg sheet, and a second direction, which is a direction of the edge section of the mounting table that the prepreg sheet and the protective sheet overhang, is greater than 30 degrees and smaller than 150 degrees;
   physically impacting the protective sheet attached to the prepreg sheet from a direction to bend fibers of the prepreg sheet, to partially peel the protective sheet from the prepreg sheet; and
   holding and moving the protective sheet partially peeled to peel the protective sheet from an entire surface of the prepreg sheet.

6. The method of peeling the protective sheet from the prepreg sheet according to claim 5, wherein the angle between the first direction and the second direction is in a range between 60 degrees and 120 degrees.

* * * * *